(12) United States Patent
Caron et al.

(10) Patent No.: US 6,178,691 B1
(45) Date of Patent: Jan. 30, 2001

(54) CAPILLARY CARPET IRRIGATION SYSTEM

(75) Inventors: Jean Caron, St-Romuald; Pierre Tardif, St-Lambert-de-Lauzon, both of (CA)

(73) Assignee: Université Laval, Quebec (CA)

( * ) Notice: Under 35 U.S.C. 154(b), the term of this patent shall be extended for 0 days.

(21) Appl. No.: 09/074,313

(22) Filed: May 8, 1998

(30) Foreign Application Priority Data

May 8, 1997 (CA) .................................................. 2204804

(51) Int. Cl.[7] .................................................. A01G 25/00
(52) U.S. Cl. .................................................. 47/79
(58) Field of Search .............................. 47/79, 81, 48.5, 47/65.9, 78, 80

(56) References Cited

U.S. PATENT DOCUMENTS

| | | |
|---|---|---|
| 1,305,434 | 6/1919 | Barlow . |
| 3,106,043 | 10/1963 | Ferrand . |
| 4,001,968 * | 1/1977 | Green ........................................ 47/80 |
| 4,023,308 * | 5/1977 | Staby ...................................... 47/48.5 |
| 4,079,547 * | 3/1978 | Walker ..................................... 47/62 |
| 4,211,036 * | 7/1980 | Dalitz ...................................... 47/66 |
| 4,219,600 | 8/1980 | Surowitz et al. . |
| 4,245,434 | 1/1981 | Green . |
| 4,276,720 | 7/1981 | Lyon . |
| 4,287,682 | 9/1981 | Browne . |
| 4,324,070 | 4/1982 | Swisher . |
| 4,428,151 | 1/1984 | Solomon . |
| 4,807,394 * | 2/1989 | Lyon ........................................ 47/79 |
| 4,837,973 | 6/1989 | Snekkens . |
| 4,955,158 * | 9/1990 | Lyon ........................................ 47/81 |
| 5,193,306 | 3/1993 | Whisenat . |
| 5,247,762 * | 9/1993 | Green ....................................... 47/79 |
| 5,575,112 | 11/1996 | Scheubel . |
| 5,651,213 * | 7/1997 | Egan ........................................ 47/56 |

FOREIGN PATENT DOCUMENTS

| | | | |
|---|---|---|---|
| 3328110 * | 2/1985 | (DE) | ................................. 47/65.9 |
| 573949 * | 12/1993 | (EP) | ................................. 47/65.9 |
| 165112 * | 12/1985 | (FR) | ................................. 47/79 D |
| 2281182 * | 3/1995 | (GB) | ................................. 47/48.5 |
| 401039914 * | 2/1989 | (JP) | ................................. 47/65.9 |
| 404099411 * | 3/1992 | (JP) | ................................. 47/65.9 |

\* cited by examiner

*Primary Examiner*—Michael J. Carone
*Assistant Examiner*—Son T. Nguyen
(74) *Attorney, Agent, or Firm*—Swabey Ogilvy Renault; Robert Mitchell

(57) ABSTRACT

The invention relates to a capillary carpet irrigation system which includes a water bearing capillary carpet disposed on a supporting surface and a plurality of water permeable pots resting upon and in hydraulic connection with the carpet. The pots contain growing medium and roots of plants. Conventional irrigation equipment supplies water to the carpet. A four layer capillary carpet includes: a water impermeable base membrane of polyethylene; and a water permeable microperforated dark coloured top membrane. Between the top and base membranes two water bearing capillary mats are supplied with water from the irrigation equipment.

9 Claims, 2 Drawing Sheets

CAPILLARY CARPET IRRIGATION SYSTEM

FIELD OF THE INVENTION

The invention relates to a capillary carpet irrigation system which includes a water bearing capillary carpet disposed on a supporting surface and a plurality of water permeable pots resting upon and in hydraulic connection with the carpet. The pots contain growing medium and roots of plants. Conventional irrigation equipment supplies water to the carpet. A four layer capillary carpet includes: a water impermeable base membrane of polyethylene; and a water permeable mnicroperforated dark coloured top membrane. Between the top and bass membranes two water bearing capillary mats are supplied with water from the irrigation equipment. The base membrane prevents water seepage into the underlying soil substrate. The microperforated top membrane permits passage of water into the carpet while inhibiting evaporation and weed growth. The dark colour also inhibits algae growth in the mats. The fine pore rigid capillary mat is disposed upon the base membrane and is capable of receiving water from the irrigation equipment. The rigid mat is relatively stiff and can retain a selected hydraulic transmissivity while supporting the weight of the pots. A resilient coarse pore capillary mat in disposed upon the rigid mat and beneath the top membrane. The compressible mat is resiliently compressible locally under each pot thus defining a plurality of localized Capillary action conduits between the rigid mat and each water permeable pot through the permeable top membrane. The resilient coarse mat when uncompressed has a negligible capillary rise and serves to inhibit evaporative water loss from the underlying rigid mat. The resilient coarse mat impedes air circulation immediately above the upper surface of water held in the water bearing rigid mat. The air within the compressible mat pores immediately above the rigid mat therefore have a high humidity. Air circulation within the compressible mat is impeded by the inherent resistance of the porous structure. Thus, water vapour escape from the water surface in the rigid mat through the perforations of the top membrane is impeded reducing evaporative water loss. To impede root growth from the pots into the top membrane and porous mats, a root growth biobarrier is disposed within each pot.

The invention relates to a capillary carpet irrigation system which includes a water bearing capillary carpet disposed on a supporting surface and a plurality of water permeable pots resting upon and in hydraulic connection with the carpet. The pots contain growing medium and roots of plants. Conventional irrigation equipment supplies water to the carpet A four layer capillary carpet includes: a water impermeable base membrane of polyethylene; and a water permeable microperforated dark coloured top membrane. Between the top and base membranes two water bearing capillary mats are supplied with water from the irrigation equipment. The base membrane prevents water seepage into the underlying soil substrate. The microperforated top membrane permits passage of water into the carpet while inhibiting evaporation and weed growth. The dark colour also inhibits algae growth in the mats. The fine pore rigid capillary mat is disposed upon the base membrane and is capable of receiving water from the irrigation equipment. The rigid mat is relatively stiff and can retain a selected hydraulic transmissivity while supporting the weight of the pots. A resilient coarse pore capillary mat is disposed upon the rigid mat and beneath the top membrane. The compressible mat is resiliently compressible locally under each pot thus defining a plurality of localized capillary action conduits between the rigid mat and each water permeable pot through the permeable top membrane. The resilient coarse mat when uncompressed has a negligible capillary rise and serves to inhibit evaporative water loss from the underlying rigid mat. The pores of the compressible mat impede air circulation immediately above the upper surface of water held in the water bearing rigid mat. The air within the compressible mat pores immediately above the rigid mat therefore have a high humidity. Air circulation within the compressible mat is impeded by the inherent resistance of the porous structure. Thus, water vapour escape from the water surface in the rigid mat through the perforations of the top membrane is impeded reducing evaporative water loss. To impede root growth from the pots into the top membrane and porous mats, a root growth biobarrier is disposed within each pot.

TECHNICAL FIELD

The invention is directed to a novel four layer irrigation carpet, including an impervious base membrane, and a permeable top membrane enveloping a rigid water bearing rigid porous mat and an overlying resilient compressible coarse porous mat, wherein the compressible mat when uncompressed serves as a mulch to inhibit water evaporation and when compressed (under the weight of pots placed upon the carpet) conducts water under capillary action from the rigid mat to the water permeable pots.

BACKGROUND OF THE ART

Large quantities of water and fertilizers are used during irrigation in nursery operations and other horticultural applications where trees and plants are grown in containers. Since the containers hold a limited volume of growing medium, there is a frequent need for watering and fertilizer supply. In the case of water demand, the containers lose water through evapotranspiration, not only from the soil's surface but also through the sides of the containers. In order to enable easy transport of the containers and plants therein, it is highly desirable to keep the volume of growing medium to a minimum, however, at the increased risk of dehydration and with a high demand on the growing medium to supply nutrients to the growing plants.

Overhead sprinkling irrigation is the method most frequently used in Canada and the United States for watering such plants and distributing dissolved fertilizers. The overhead sprinkler technique is not particularly efficient in terms of water use however, and studies have reported losses of up to 90% of the volume of water used. Part of this water loss is from evaporation and part from surface runoff. As a result of evaporation, dissolved compounds such as salt, nutrients, calcium, etc. gradually deposit upon the irrigated surfaces. Irrigation water is also lost through runoff and represents a contamination risk for the soil surface and groundwater. Runoff water contains fertilizers, nutrients, biosides and granular herbicides which are leached from the soil substrate.

In recognition of this problem, regulations have been adopted or are impending in a number of North American or European jurisdiction. The intent of the regulations is to require closed circuit irrigation and fertilization systems with no runoff permitted. A closed system would require recovery and recirculation of water and nutrients, however, at present there are few cost effective options available to nursery producers. A closed system would require installation of water catchment and treatment systems involving holding tanks and filtration systems, together with rigorous monitoring of water quality to regulate the accumulation of salts and contaminants.

Micro-irrigation systems provide another alternative, however, they do not necessary eliminate all runoff due to leaching from the bottom of the containers, Micro-irrigation however, does have the advantage of significantly reducing the volumes of water used. Due to the high installation costs however, micro-irrigation is an expensive alternative and requires strict control on water quality to avoid plugging of the conduits and other components of the system. In addition, micro-irrigation systems are best suited for uniform arrays of similar plants and are not flexible in respect of placement and size of containers used. For these reasons, the application of micro-irrigation has been restricted to production of large trees in containers with a volume greater than 20 liters. Micro-irrigation therefore cannot be considered as a general solution to the problems faced by nursery growers utilizing conventional irrigation systems.

A further alternative used in the prior art is sub-irrigation where plants in pots are placed upon capillary mats which provide water through capillary action into the bottom of a permeable pot. A significant advantage of the sub-irrigation system is that no further equipment is required other than that already at the disposal of producers who generally use overhead sprinkler irrigation systems.

The sprinklers are used to water the plants and any water falling between pots is captured by the capillary mat. The water saturated capillary mat thereafter, provides water on demand through capillary action from the roots and permeable base of the pot resting on the capillary mat. Water quality control is not effected since water quality is of the same nature as required by conventional sprinkler irrigation systems. Control of nutrient concentration is required where evaoporation loss is high. Sub-irrigation allows water to be provided according to the needs of each plant on demand since water is drawn up under capillary action by the roots and permeable pot base resting on the saturated capillary mat.

Therefore, sub-irrigation on capillary mats is a viable alternative that meets the objectives of a closed system namely, elimination of runoff water and environmental risks associated, and efficient use of water and fertilizers over conventional systems. Sub-irrigation on capillary mats generally involves maintaining the capillary mats at or near saturation point in order to provide the plants with a constant supply of water. Water moves from the saturated mat to the pots, soil substrate and roots by capillary ascent.

However, due to several disadvantages, the use of capillary mats has traditionally been restricted to greenhouse applications. For example, the water held by the mat often evaporates from the surface and constitutes a not lose in addition to contributing to deposit of salts, nutrients, etc. on the mat surface itself. In humid greenhouses however, where there is a high relative humidity and absence of air movement, evaporation is not a major problem in contrast to field conditions. In an open field, where a nursery includes large trees, for example, algae and weeds will rapidly grow in the exposed surface of the capillary mat. As well, in an open field the low relative humidity of the air, solar heat radiation and high air movements will result in high evaporative losses. As result therefore, these drawbacks have limited the interest in sub-irrigation practices for outdoor use in nurseries. Although sub-irrigation can eliminate runoff in the environment, the not result is a decrease in water use efficiency due to high evaporative losses.

To address the problem of surface evaporation and accompanying salt accumulation on the capillary mat, and to limit algae growth and weed growth in the capillary mats, prior art systems have included a porous perforated plastic sheet on the top surface of the capillary mat. The perforated sheet allows rain water and irrigation sprinkler water to flow through the perforations into the capillary mat. The perforated sheet also allows water to flow out of the capillary mat into the bottom of permeable pots resting on the mat. While dark colored perforated plastic sheets have been very efficient in preventing algae growth in the capillary mat, they still allow significant evaporation from the surface to the extent that evaporated losses exceed losses experienced through recycling or standard irrigation with no recycling. The stored water surface is directly under the top perforated sheet in such prior art carpets, and evaporative loss through the perforated sheet is prohibitively high.

A further problem with sub-irrigation is the tendency for roots of the plants to grow through holes in the pot and into the mat itself. Roots of some species of shrubs for example, have very vigorous root development, emerge from the pot container and continue to grow into the capillary mat layers. In a commercial operation, this root growth results in damage to the roots when pots are lifted from the mat and further during transport. Decomposition of the roots in the mat has a detrimental effect on the structural and hydraulic properties of the mat.

Conventional responses to this problem include biobarriers which include a herbicide or copper. Copper biobarriers release copper ions into water saturated soil. The copper ions in solution in the soil have a proven inhibitory effect on root apex growth. In the presence of copper ions, the roots cease to grow and branch out. U.S. Pat. No. 5,575,112 describes a copper coated geosynthetic membrane for such an application. A disadvantage of this system is that the hydraulic properties of the copper treated synthetic membrane do not allow an adequate hydraulic connection between the capillary mat and the pot substrate. Although the root growth problem has been solved by such a system, there is significant hydophobic impediment placed between the hydraulic connection of the capillary mat and soil substrate, and the biobarrier becomes unworkable. Copper coated geosynthetics available on the market require use of a resin which contains copper hydroxide. It is believed that the resin creates a hydrophobic bebaviour in the geosynthetic membrane. For subirrigated containers on a capillary mat this characteristic increases the risk of hydraulic rupture between the mat and the substrate.

It is an object of the present invention to provide a copper impregnated biobarrier which has adequate hydraulic properties to facilitate the hydraulic connection between the water bearing mat and substrate held within the pots.

It is a further object of the invention to provide an enhanced capillary mat which will overcome the problem of evaporated losses experienced with prior art capillary mats when used outdoors.

DISCLOSURE OF THE INVENTION

The invention relates to a capillary carpet irrigation system which includes a water bearing capillary carpet disposed on a supporting surface and a plurality of water permeable pots resting upon and in hydraulic connection with the carpet. The pots contain growing medium and roots of plants. Conventional irrigation equipment supplies water to the carpet.

A novel four layer capillary carpet includes: a water impermeable base membrane of polyethylene; and a water permeable microperforated dark coloured top membrane. Between the top and base membranes two capillary mats are supplied with water from the irrigation equipment. The impermeable base membrane prevents water seepage into the underlying soil substrate. The microperforated top membrane permits passage of water into the carpet while inhibiting evaporation and weed growth. The dark colour also inhibits algae growth in the mats.

The fine pore rigid capillary mat is disposed upon the base membrane and is capable of receiving water from the irrigation equipment. Irrigation water may be supplied by micro-irrigation conduits directly. Preferably water is supplied indirectly from irrigated water spray and rainfall absorbed through the micropores of the top membrane and percolating downward through an overlying coarse pore compressible mat. The rigid mat is relatively stiff and can retain a selected hydraulic transmissivity while supporting the weight of the pots.

A resilient coarse pore capillary mat is disposed upon the rigid mat and beneath the top membrane. The compressible mat is resiliently compressible locally under each pot thus defining a plurality of localized capillary action conduits between the water bearing rigid mat and each water permeable pot through the permeable top membrane. The resilient compressible mat when decompressed has a negligible capillary rise and serves to inhibit evaporative water loss from the underlying rigid mat. The pores of the compressible mat impede air circulation immediately above the upper surface of water held in the water bearing rigid mat. The air within the compressible mat pores immediately above the rigid mat therefore have a high humidity and water vaporisation at the surface is therefore inhibited by the high vapour concentration of air in the compressible pores. Air circulation within the compressible mat is impeded by the inherent resistance of the porous structure. Thus, water vapour escape from the water surface in the rigid mat through the perforations of the top membrane is impeded reducing evaporative water loss, even when used in outdoor applications To impede root growth from the pots into the perforated top membrane and porous mats, a root growth biobarrier is disposed within each pot. The biobarrier is a compressed peat substrate containing a selected concentration of copper ions which inhibit the root tip growth and encourage root branching. Root spiralling or winding within the pot is also prevented. If desired, the entire inner surface of the pot can include a biobarrier. The biobarrier is fabricated in a simple manner by soaking an inexpensive pressed peat disc in a solution of copper salts. The disc is placed-in a pot or is formed into part of the pot itself. Copper ions are released into the water adjacent the pot walls when the plants are watered and serve to inhibit root apex growth in the immediate area.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
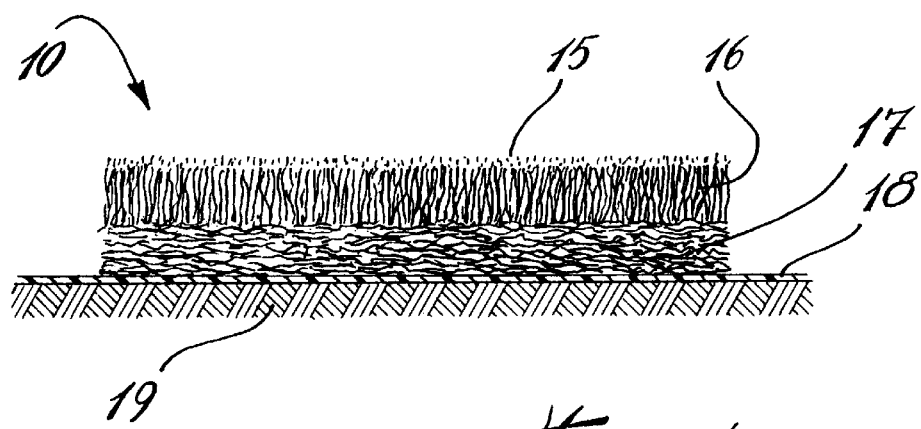
FIG. 1 is a cross-sectional elevation view through a four layer capillary carpet according to the invention which is resting on a soil substrate.
Figure 2:
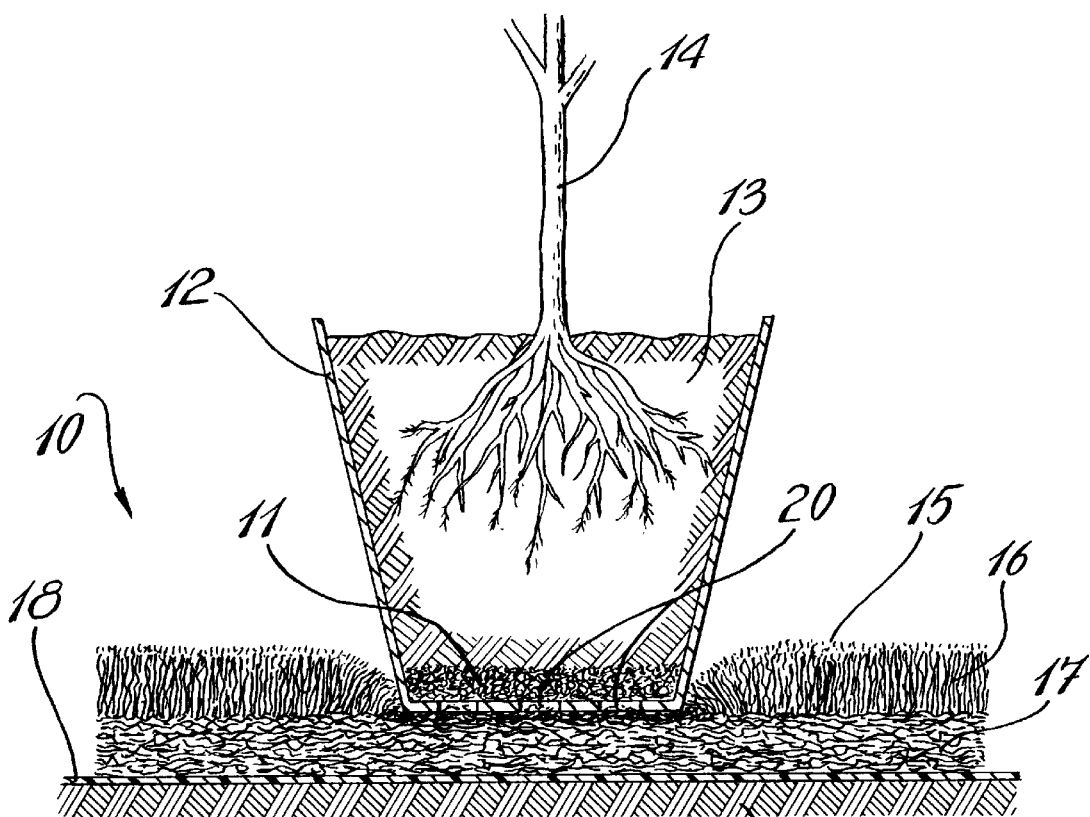
FIG. 2 is a light cross-sectional elevation view of the four layer capillary mat with a nursery pot container placed thereon showing the collapsing of the compressible porous mat thereby permitting capillary action conduction of water between the water bearing rigid mat and the permeable bottom of the pot.
Figure 4:
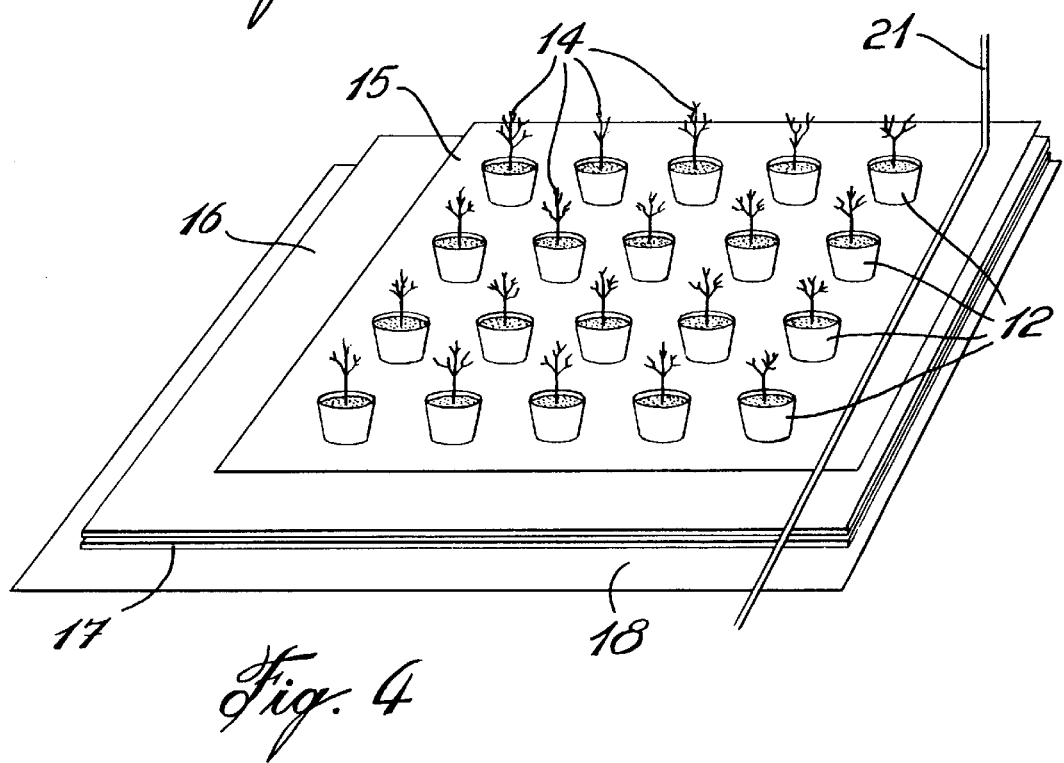
FIG. 4 is a perspective view of an array of nursery pots with stock plants placed upon the capillary carpet and showing a conventional sprinkler irrigation head with supply conduit which recharges the water bearing capillary carpet with water spray on a periodic basis.

With reference to FIGS. 1 and 2, the drawings show a capillary carpet 10 used in a subirrigation system. The water bearing capillary carpet 10 is disposed on a supporting soil surface 19. As indicated in FIG. 4, an array of water permeable pots 12 rest upon the capillary carpet 10. The pot 12 contains soil or other growing medium 13 and embedded plants roots 14. The base of the pot 12 is water permeable with a permeable, pot base 20. For example, the pot base 20 may have perforations or is made of a permeable material such as compressed peat.

Figure 3:
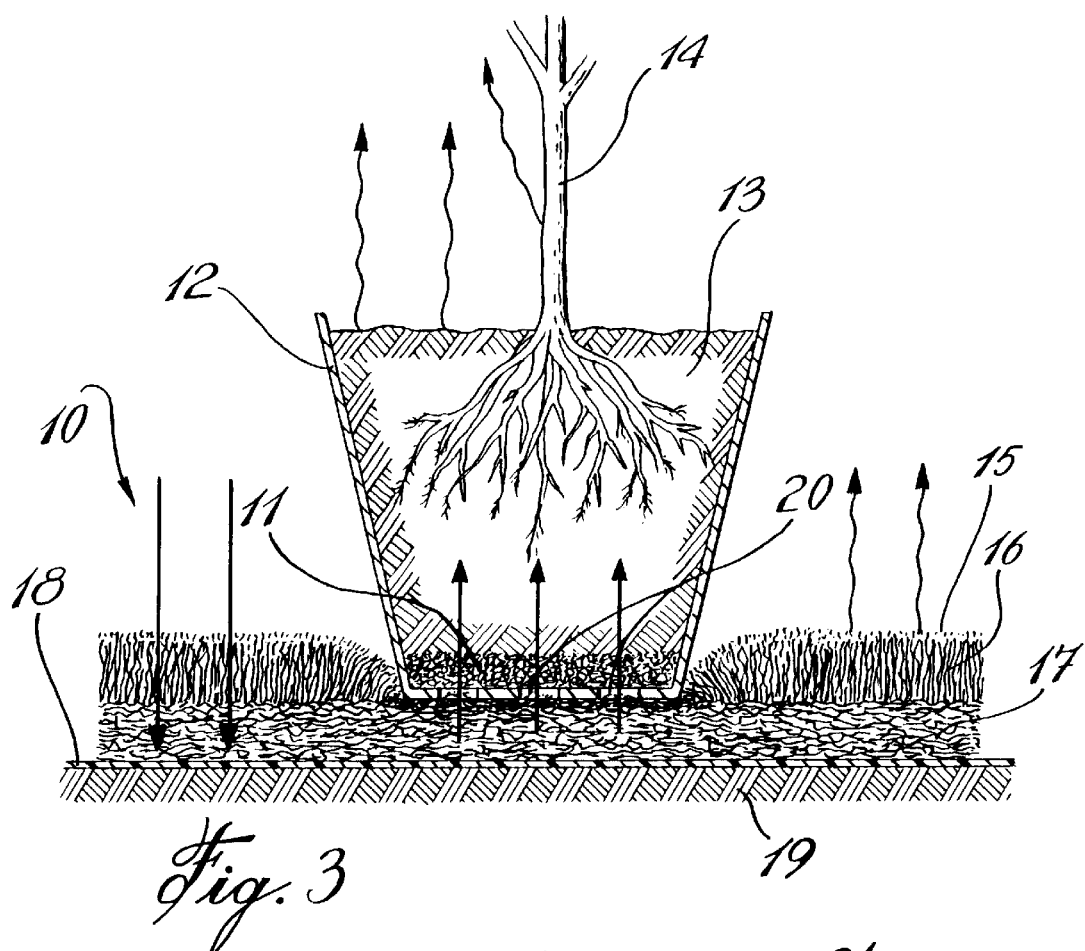
FIG. 3 is a cross-sectional elevation view showing the movement of water during irrigation, capillary rise into the pot, carpet surface evaporation, evapotranspiration from the plant and water evaporation from the top of the growing medium.

As indicated in FIG. 4, sprinkler irrigation heads 21 (or other conventional irrigation systems such as perforated microirrigation conduits) are used to charge the carpet 10 with water The permeable pot base 20 is in hydraulic connection with the carpet 10. Stored water in the capillary cot 10 is passed through the permeable pot base 20 into the growing medium 13 and plant roots 14 by capillary action. FIG. 3 illustrates the cycle of water movement through the carpet 10 and pot container 12, which will be explained in detail below.

Referring to FIG. 1, the capillary carpet 10 is built up of four separate layers and is supported on a relatively flat supporting soil surface 19. The capillary action of the carpet 10 is sufficient however, to move water over a height of 6 to 7 centimeters vertically and therefore can accomodate some slight unevenness of the ground surface 19. However, since water is distributed homogeneously through the capillary carpet 10, where a significant slope or discontinuities in the soil surface 19 are present, it is preferable to cut the capillary carpet 10 into sections laid perpendicular to the slope of the soil surface 19.

The four layer capillary carpet 10 includes the following layers. The base membrane la is impermeable and can comprise a commonly available polyethylene agricultural sheet for example. The top membrane 15 is water permeable to allow the passage of irrigated sprinkler water downward into the carpet itself 10 and to allow capillary passage of water from the carpet 10 to the permeable pot base 20. A dark colored microperforated polyethylene sheet is preferred. The dark color will inhibit the growth of algae in the wetted interior surfaces of the capillary carpet 10. The microperforated structure will permit slow capillary passage of water from the capillary carpet 10 to the pot 12 while also inhibiting rapid evaporation of the water from the interior of the carpet 10 to a limited extent.

Between the impermeable base membrane 18 and the water permeable top membrane 15, are two capillary mats, a rigid capillary mat 17 which is maintained generally in a water saturated state and a collapsible capillary mat 16 disposed upon the rigid mat. The rigid capillary mat 17 rests upon the impermeable base membrane and is capable of receiving water and storing water from the irrigation system 21. The rigid mat 17 retains adequate hydraulic transmissivity while supporting the weight of the pots 12 and weight of worker's walking on the carpet surface. For example, the rigid mat 17 can comprise a non-woven synthetic geofabric with a fine pore structure and sufficient rigidity to support the loads imposed on it while maintaining its hydraulic transmissivity to supply water to the pots 12.

As indicated in a comparison between FIGS. 1 and 2, a collapsible capillary mat 16 is disposed upon the rigid mat 17 and beneath the top permeable membrane 15. The collapsible mat 16 is compressible locally under each pot, as shown in FIGS. 2 and 3, and the locally compressed collapsible capillary mat 22 under each pot 12 defines a localized capillary action conduit to conduct water between the rigid mat 17 and each pot 12 through the permeable top membrane 15.

With reference to FIG. 3, the cycle of water movement is illustrated. As indicated with arrows, the initial water is provided by the irrigation sprinkler 21 in the form of precipitation. Some of the sprinkled water will fall on the plants 14 and into the pot 12, however, a large portion will fall on the capillary carpet 10 between the pots 12. The sprinkled water will percolate under gravity through the micropores of the permeable top membrane 15 into the collapsible capillary mat 16 and further downward to be stored in the pores of the rigid capillary mat 17. The impermeable base membrane 18 prevents water from escaping the capillary carpet 10 into the underlying supporting soil surface 19.

The amount of sprinkler irrigation water provided will be regulated to ensure that the rigid capillary mat 17 remains in a substantially saturated state whereas the compressible capillary mat 16 is relatively free of water between the pots.

The rigid mat 17 is designed with a selected hydraulic tranamissivity at saturation at least equal to the evapotranspirative demand of the plants 14. With reference to FIG. 3, the hydraulic connection between the rigid capillary mat 17 and the permeable pot base 20 enables water to pass under capillary action as indicated by arrows into the pot 12. A relatively small amount of evaporated water will pass through the compressible capillary mat 16 and through the pores of the permeable top membrane 15 as indicated by arrows. The bulk of the water, however, will be conducted into the soil substrate 13 within the pot 12. A portion of the water will escape in the form of evaporation from the soil substrate 13 as indicated by an arrow. A substantial amount of the water will be will absorbed by the roots of the plant 14, utilized in photosynthesis by the plant and exhausted to the ambient air through evapotranspiration of the plant as indicated by an arrow.

Both the rigid capillary mat 17 and the compressible capillary mat 16 are porous synthetic geotextiles with high porosity at least 85 percent and each generally with an uncompressed thickness of at least 5 millimeters.

The rigid capillary mat 17 has a fine pore structure whereas the compressible capillary mat 16 has a coarse pore structure in the embodiment illustrated. This choice of pore sizes in general provides a rigid mat 17 and a compressible mat 16 where both mats are made of the same synthetic material. If different materials with different elasticity were used however, it may be possible to have pore sizes that are of relatively the same size.

The importance of the distinction between the rigid mat 17 and compressible mat 16 is in the differences in structural strength (compressibility) and in relative hydraulic transmissivity. The rigid mat 17 must retain sufficient rigidity to support the pots 12 and any workers walking on the mat surface while retaining the selected hydraulic transmissivity. Preferably the rigid mat 17 has the capacity to retain its lateral hydraulic transmissivity while also being subjected to a capillary suction from the pots 12 in the range of −8 to −9 centimeters pressure. In contrast the compressible mat 16 in an uncompressed state has a negligible capillary rise. In the embodiment illustrated this negligible capillary rise is provided by having relatively large pore sizes or coarse pores to inhibit small size meniscus formation and resultant capillary rise However, when the compressible mat 16 is compressed under the weight of an overlying pot 12, the compressed coarse mat material under the pot base 20 has a locally reduced pore size such that capillary conduction of water from the rigid mat 17 occurs into the permeable pot base 20.

The capillary carpet 10 therefore, provides a superior control of surface water evaporation over conventional carpets. The fine pores of the lower rigid mat 17 provide a water reservoir. The relatively large or coarse pores of the compressible coarse mat 16 act as a mulch and inhibit the evaporation of water from the rigid mat 17.

In contrast, where a conventional capillary mat is merely covered with a perforated plastic sheet, many of the pores in the perforated plastic sheet remain saturated with water and evaporative loss of water from the saturated mat to the atmosphere is relatively high. In the present invention, however, the perforated top membrane 15 is separated from the water bearing rigid mat 17 by the compressible mat 16. The compressible mat 16 acts as a mulch layer being a physical equivalent of a mere stationary layer of air The transfer of water vapour from the saturated rigid mat 17 must be pass through the compressible mat 16 where slowly mobile air pockets highly reduce the movement of the water vapour and inhibit the surface evaporation process. The compressible mat 16 however, also has the property that when compressed as indicated in FIG. 2, the compressible mat 16 can conduct liquid water under capillary action from the saturated rigid mat 17 through the perforated top membrane 15 into the permeable pot base 20.

In conclusion therefore, the introduction of the compressible capillary mat 16 between the permeable top membrane 15 and saturated rigid mat 17 serves to severely restrict water evaporation in the areas of the carpet 10 which are not in contact with a pot 12 while also allowing for subirrigation capillary action movement of water from the saturated mat 17 to the pot 12. The water and dissolved nutrients that are distributed by the irrigation spray head 21 and fall between the pots 12 are stored in the carpet 10 and reused by the plants on demand by subirrigation. The presence of the mulch or compressible mat 16 limits evaporation of water stored in the rigid mat 17.

To prevent growth of the roots into the capillary carpet 10. A biobarrier 11 is inserted at the bottom of the pot 12. The biobarrier inhibits the emergence of roots from the bottom of the pot 12 and prevents roots from growing into the capillary mat 10. The biobarrier 11 also can be provided within the entire internal surface of the pot 12 (not shown) to improve root ramification and eliminate root spiraling. Growth of roots from the pot 12 into the capillary carpet 10 has significant disadvantages When the pot 12 is moved the roots will be broken and remained tangled in the fibres of the carpet 10. Decomposition of the roots in the mat will damage the mat structure and effect the hydraulic properties of the mat.

The root growth biobarrier 11 is disposed within the pot 12 and preferable comprises a compressed peat substrate containing a selected concentration of copper ions. When the biobarrier 11 is wetted by water from the conventional irrigation process or subirrigation from the capillary mat 10, the copper ions are released into solution and produced the desired root inhibiting effect. Copper is immobile in organic media such as nursery peat base substrates and the risk of toxicity to plants is limited. Released copper ions are rapidly absorbed by the growing medium 13 in the immediate proximity of the biobarrier 11 and serve to inhibit root growth in the immediate area. The use of the compressed peat as the substrate for the biobarrier provides superior hydraulic properties to synthetic fabrics of the prior art. Pressed peat in addition is relatively inexpensive compared to synthetic geofabrics and cooper fixation by simply soaking the peat in a salt solution is relatively inexpensive compared to conventional methods of fixing copper with a resin to a geosynthetic membrane. Pressed peat can be molded into various shapes including forming the entire pot 12 out of peat or coating the entire interior surface of the pot. The biobarrier as well can be used in landfill sights, landscape architecture, etc. to prevent root growth or as a rooting bag to prevent root spiraling even in conventionally irrigated nursery operations.

The biobarrier 11 can be comprised entirely of pressed natural peat, or a mixture of peat and synthetic fibres compressed together for added strength and ease of manufacture, For example, compressed peat may be mixed with a non-woven synthetic fibre fabric to provide rigidity and prevent breakage of the biobarrier during fabrication or storage.

In summary therefore, watering of the capillary mat 10 is ideally made with an overhead sprinkler irrigation device 21 as illustrated since this is the most common method used and does not involve purchase of additional equipment. Water can also be supplied through drip irrigation directly into the capillary carpet 10 to saturate the rigid fine pore capillary mat 17 or even directly into the pots 12. Any excess water will drain through the permeable pot base 20 and be stored in the rigid capillary mat 17 for future use on demand from the plant. A drip irrigation line can also be installed if desired between the compressible mat 16 and rigid mat 17 to maintain saturation of the rigid mat 17. The provision of water by the sprinkler irrigation system 21 initiates the capillary rise of water by creating a continuous column of water between the capillary mat 10 and the conducting pores of the soil substrate 13. Irrigation sequence is timed to resaturate the fine rigid capillary mat 17. If irrigation is terminated when the rigid capillary mat 17 is saturated, no runoff will occur. During sprinkler irrigation, part of the irrigated water falls into the pots 12 and part falls between the pots 12 onto the capillary carpet 10. Water stored in the rigid mat 17 rises by capillary ascent into the soil substrate 13 through the compressed coarse mat directly under the overlying pot 12. Water passes easily through the microperforated permeable top membrane 15 and permeable pot base 20. A significant advantage of subirrigation is that various types of plants having various demands for water can be positioned side by side. The amount of water drawn under capillary action from the saturated rigid mat 17 is provided automatically by the demand of the plant itself.

In order to enable irrigation at a frequency of only once a day, it is considered desirable that the thickness of the capillary mat 10 be chosen to retain a water reserve equivalent to the average evapotranspiration of a summer day for the plants and pots 12 positioned on the capillary mat 10.

Although the above description and accompanying drawings relate to a specific preferred embodiment as presently contemplated by the inventors, it will be understood that the invention in its broad aspect includes mechanical and functional equivalents of the elements described and illustrated.

We claim:

1. In a capillary carpet irrigation system including a water bearing capillary carpet disposed on a supporting surface and a plurality of water permeable pots resting upon and in hydraulic connection with the carpet, the pots adapted for containing roots of plants disposed therein, and irrigation means for supplying water to the carpet, the improvement comprising:

a four layer capillary carpet comprising:
a water impermeable base membrane;
a water permeable top membrane;
a rigid capillary mat disposed upon the base membrane and capable of receiving water from the irrigation means, the rigid mat retaining a selected hydraulic transmissivity while supporting the weight of the pots; and
a collapsible capillary mat disposed upon the rigid mat and beneath the top membrane, the collapsible mat being compressible locally under each pot thus defining a plurality of localized capillary action conduits between the rigid mat and each water permeable pot through the permeable top membrane, while restricting water evaporation in areas where said collapsible capillary mat is uncompressed, wherein the collapsible mat when uncompressed has negligible capillary rise and wherein said collapsible mat is resiliently compressible.

2. A capillary carpet according to claim 1 wherein the base membrane comprises a polyethylene sheet.

3. A capillary carpet according to claim 1 wherein the top membrane comprises a microperforated dark coloured polyethylene sheet.

4. A capillary carpet according to claim 1 wherein the rigid mat has a fine pore structure.

5. A capillary carpet according to claim 1 wherein the rigid mat has said selected hydraulic transmissivity at saturation of at least equal to an evapotranspirative demand of said plants.

6. A capillary carpet according to claim 5 wherein the rigid mat has the capacity to retain said selected hydraulic transmissivity while subjected to a capillary suction in the range of −8.0 to −9.0 cm. pressure.

7. A capillary carpet according to claim 5 wherein the rigid mat is a porous synthetic geotextile having a porosity of at least 85% and an uncompressed thickness of at least 5 mm.

8. A capillary carpet according to claim 1 wherein the collapsible mat has a coarse pore structure.

9. A capillary carpet according to claim 1 wherein the collapsible mat is a porous synthetic geotextile having a porosity of at least 85% and an uncompressed thickness of at least 5 mm.

\* \* \* \* \*